(12) United States Patent
Sato et al.

(10) Patent No.: US 10,014,082 B2
(45) Date of Patent: Jul. 3, 2018

(54) NUCLEAR POWER PLANT AND REACTOR BUILDING GAS TREATMENT SYSTEM

(71) Applicant: Kabushiki Kaisha Toshiba, Minato-ku (JP)

(72) Inventors: Takashi Sato, Yokohama (JP); Keiji Matsumoto, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 610 days.

(21) Appl. No.: 14/718,691

(22) Filed: May 21, 2015

(65) Prior Publication Data

US 2015/0357063 A1   Dec. 10, 2015

(30) Foreign Application Priority Data

Jun. 10, 2014 (JP) .................. 2014-119267

(51) Int. Cl.
  *G21C 9/00* (2006.01)
  *G21C 15/18* (2006.01)
  *G21C 9/004* (2006.01)

(52) U.S. Cl.
  CPC ............. *G21C 15/18* (2013.01); *G21C 9/004* (2013.01); *Y02E 30/40* (2013.01)

(58) Field of Classification Search
  CPC .................................. G21C 15/18; G21C 9/004
  USPC ......................................... 376/309, 313, 314
  See application file for complete search history.

(56) References Cited

U.S. PATENT DOCUMENTS 5,011,652 A * 4/1991 Tominaga ............... G21C 15/18
                                                                              376/283

5,227,127 A * 7/1993 Sato ....................... G21C 9/004
                                                                              376/309

FOREIGN PATENT DOCUMENTS

| JP | 2000-9873 | 1/2000 |
|---|---|---|
| JP | 2002-257970 A | 9/2002 |
| JP | 2005-043131 | 2/2005 |
| JP | 2013-246098 | 12/2013 |
| JP | 2014-119267 | 6/2014 |

OTHER PUBLICATIONS

Extended Search Report dated Jan. 22, 2016 in European Patent Application No. 15168908.0.

* cited by examiner

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

A nuclear power plant according to an embodiment comprises: a reactor well; a reactor well upper lid; an operation floor; an operation floor area wall; a standby gas treatment system; and a reactor well exhaust section to release the gas inside the reactor well to the environment without releasing the gas into the operation floor area in an event of a predetermined accident, e.g., causing diminished cooling of a containment vessel or otherwise increasing its temperature. The standby gas treatment system includes: a suction pipe to take in gas inside the reactor building; an exhaust fan; a standby gas treatment system exhaust pipe; a heater that is disposed between the suction pipe and the standby gas treatment system exhaust pipe; and a filter to filter the gas heated by the heater and to send the gas to the standby gas treatment system exhaust pipe.

12 Claims, 9 Drawing Sheets

RELATED ART

FIG.9

RELATED ART

NUCLEAR POWER PLANT AND REACTOR BUILDING GAS TREATMENT SYSTEM

CROSS-REFERENCE TO RELATED APPLICATION

This application is based upon and claims the benefit of priority from Japanese Patent Application No. 2014-119267, filed on Jun. 10, 2014; the entire content of which is incorporated herein by reference.

FIELD

Embodiments of the present invention relate to a nuclear power plant and a reactor building gas treatment system.

BACKGROUND

Figure 8:
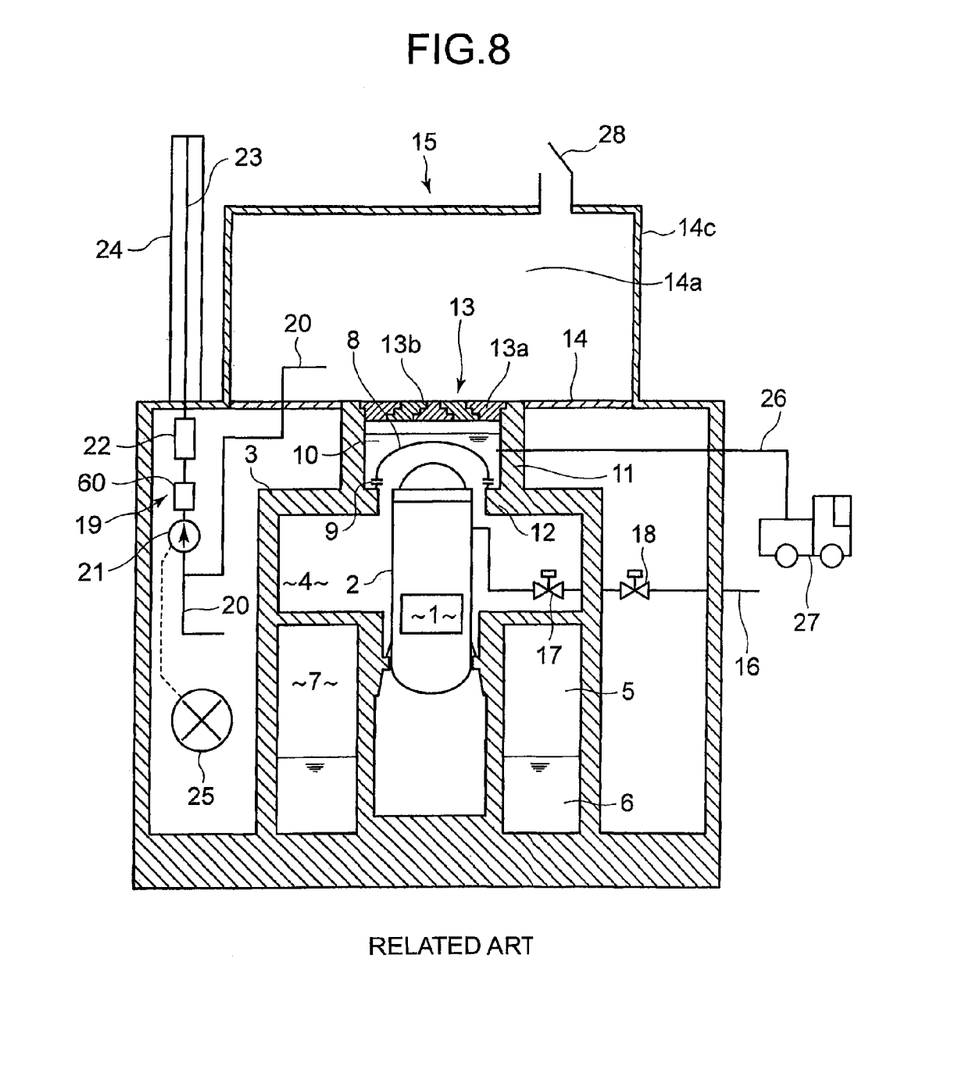
FIG. 8 is an elevation view of a conventional nuclear power plant with a reactor building gas treatment system.
Figure 9:
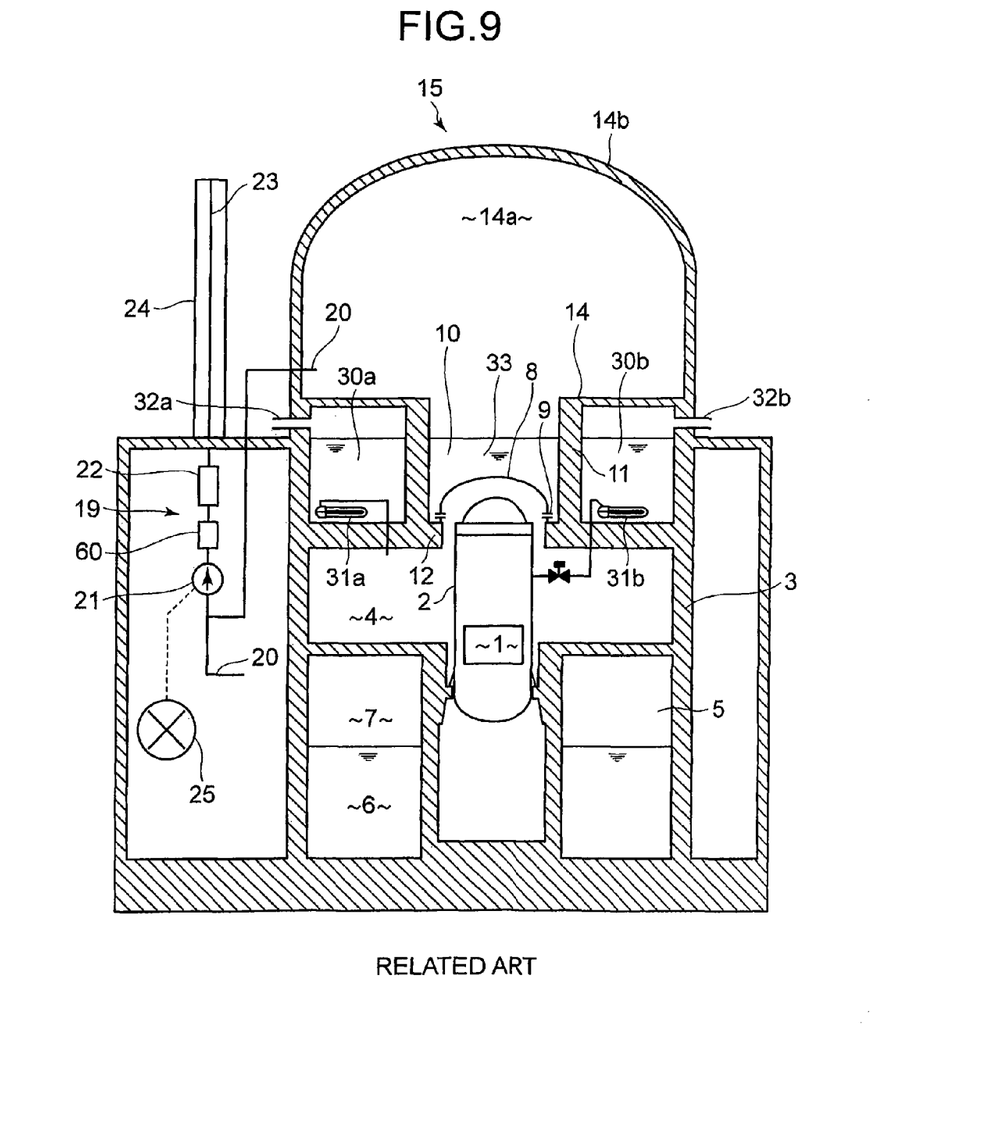
FIG. 9 is an elevation view of a conventional nuclear power plant of passive safety with a reactor building gas treatment system.

With reference to FIGS. 8 and 9, a reactor building gas treatment system of a conventional boiling water-type nuclear power plant will be outlined.

FIG. 8 shows an example of a conventional plant called ABWR. In FIG. 8, a core 1 is housed inside a reactor pressure vessel 2. The reactor pressure vessel 2 is housed inside a containment vessel 3. The inner portion of the containment vessel 3 is divided into a dry well 4, which houses the reactor pressure vessel 2, and a wet well 5. The wet well 5 contains a suppression pool 6. Above the suppression pool 6, a wet well gas phase portion 7 is formed.

The atmosphere in the containment vessel 3 is replaced with nitrogen in order to keep oxygen concentration low, in the case of a boiling water light water reactor. Based on the material thereof, containment vessels 3 are generally categorized into a steel containment vessel, a reinforced concrete containment vessel (RCCV), a steel concrete composite structure (SC structure) containment vessel (SCCV), and the like. In the case of RCCV, a steel liner is put on the inner surface. FIG. 8 shows an example of RCCV, which is used in ABWR.

On top of the containment vessel 3, a containment vessel head 8 made of steel is provided. The containment vessel head 8 is joined to the containment vessel 3 via a containment vessel head flange 9. The containment vessel head 8 can be detached at the time of refueling. On an outer peripheral portion of the containment vessel head 8, there is a space known as a reactor well 10. The reactor well 10 is a space formed by a reactor well sidewall 11, which surrounds the periphery of the containment vessel head 8 and extends upward, a reactor well bottom portion 12, which is connected to a lower end of the reactor well sidewall 11 in such a way as to support the reactor well sidewall 11, the containment vessel head 8, and a shield plug 13. The reactor well bottom portion 12 is part of the containment vessel 3 in the case of RCCV. However, the reactor well bottom portion 12 is part of shield concrete that surrounds the periphery of a steel containment vessel in the case of the steel containment vessel. In general, the reactor well 10 is circular in horizontal cross section. However, the reactor well 10 may be elliptical or polygonal.

Above the reactor well 10, the shield plug 13 is placed. The shield plug 13 is mainly made of concrete, and is divided into several blocks 13a. The reason is to lighten the weight of one block 13a. The function of the shield plug 13 is to block radiation generated during the operation of a reactor. The joint areas of blocks 13a are therefore formed into a stepwise pattern, thereby blocking radiation from leaking via a gap 13b between the blocks toward an upper area. The gap 13b between the joint areas of blocks 13a may be about 1 cm, for example. Therefore, when the reactor starts to operate, the air inside the reactor well 10 is heated and expands. Part of the air passes through the gap 13b into the upper area.

Outside the reactor well 10, an operation floor 14 is provided in such a way as to connect to an upper end of the reactor well sidewall 11. An upper portion of the operation floor 14 is covered with an operation floor area wall 14c, which is part of a reactor building 15, in such a way as to form an operation floor area 14a, which is part of the space inside the reactor building 15.

To the reactor pressure vessel 2, major penetrating pipes, such as main steam lines and feed water lines, are connected. These lines or pipes penetrate the containment vessel 3 and then the reactor building 15, before being connected to a turbine and a main condenser inside a turbine building (not shown). Those major pipes, such as the main steam lines and the feed water lines, are collectively referred to as penetrating pipe 16 in the figures.

On the penetrating pipe 16, a first isolation valve (penetrating pipe isolation valve) 17 and a second isolation valve (penetrating pipe isolation valve) 18 are placed near the wall surfaces of the containment vessel 3. The figure shows an example in which the first isolation valve 17 is placed near the inner wall surface of the containment vessel 3, and the second isolation valve 18 is placed near the outer wall surface of the containment vessel 3. However, both of the two valves may be placed outside the containment vessel 3 in some cases.

If radioactive materials are released into the inner portion of the containment vessel 3 in the event of a design basis accident such as a loss-of-coolant accident, the isolation valves are automatically closed in order to prevent the leak of radioactive materials via the penetrating pipe 16 to the outside as much as possible. However, there is a design leakage rate set for the isolation valves, meaning that very small amount of radioactive materials would leak to the outside. Moreover, there is a design leakage rate (e.g., 0.4%/d in the example of ABWR) set for the containment vessel 3, meaning that very small amount of radioactive materials would leak from inside the containment vessel 3 into the inside of the reactor building 15.

In the reactor building 15, a standby gas treatment system (SGTS) 19 is provided. The standby gas treatment system 19 is designed to take in radioactive materials that are leaked into the reactor building 15 along with the atmosphere inside the reactor building 15, and removes the radioactive materials through a filter, and then releases the mainly decontaminated air into the environment from a high position. The standby gas treatment system 19 includes many branched suction pipes 20, an exhaust fan 21, a filter (filter train) 22, a standby gas treatment system exhaust pipe 23, and a heater 60. The heater 60 is disposed on the upstream side of the filter train 22. The standby gas treatment system 19 also includes isolation valves, which are not shown in the figure.

Inside the filter train 22, a charcoal filter filled with activated carbon is housed. The charcoal filter is capable of removing 99% or more of radioactive materials such as cesium iodide (CsI), for example. However, if the charcoal filter is wet, its performance becomes deteriorated. Accordingly, the atmosphere needs to be heated by the heater 60 in advance in order to limit the moisture. The standby gas treatment system exhaust pipe 23 is led into a stack 24 so that gas is released from an upper end thereof.

Inside the stack 24, the standby gas treatment system exhaust pipe 23 extends upward, thereby forming a doubletube structure, which is made up of the standby gas treatment system exhaust pipe 23 and the stack 24.

The exhaust fan 21, the heater 60, and the isolation valves of the standby gas treatment system 19 require an electric power source to operate. In the event of a design basis accident, electric power is supplied from an emergency DG (diesel generator) 25.

However, in the accident at the Fukushima Daiichi nuclear power plant, the offsite power was lost due to the earthquake and tsunami. Moreover, all emergency DGs 25 failed, and the system could not receive any supply of power from AC power sources, which is known as station blackout (SBO). The standby gas treatment system 19 therefore could not operate. Moreover, the core 1 could not be sufficiently cooled, resulting in a core melt accident. The cladding tube of the melted core fuel reacted with high temperature water, and the metal-water reaction generated large amounts of hydrogen, and the inside of the containment vessel 3 was over-pressurized.

In such a severe accident, the cooling of the containment vessel 3 could be insufficient, and the atmosphere inside the containment vessel 3 could become high in temperature, probably causing damage to the containment vessel head flange 9. As a result, hydrogen could leak into the reactor well 10 via the containment vessel head flange 9, and then into the operation floor area 14a via the gap 13b of the shield plug 13.

Moreover, a penetrating portion of the penetrating pipes 16 or hatch (not shown) portion could deteriorate at high temperatures, causing hydrogen to leak into the reactor building 15. Then, the hydrogen could rise up due to buoyancy, and be accumulated inside the operation floor area 14a. Because part of the operation floor 14 has an opening, such as staircase (not shown) the hydrogen can get into the operation floor area 14a via the opening. Then, the detonation of the hydrogen inside the operation floor area 14a caused damage to the reactor building 15.

In order to prevent such an event, an external water injection pipe 26 is provided so that water can be poured into the reactor well 10 from the outside. In the event of a severe accident, water can be poured from a fire truck 27 or the like in order to cool the containment vessel head flange 9. In this manner, new measures have been taken. Moreover, a new hydrogen vent system 28 is provided in the ceiling of the reactor building 15 so that the hydrogen accumulated in the operation floor area 14a can be released to the external environment.

Although the above description is for the containment vessel 3 and the reactor building 15 of an ABWR, those basic features are identical to those of conventional BWR/2, BWR/3, BWR/4, and BWR/5, which have been available prior to ABWR.

With reference to FIG. 9, an example of a conventional passive safety BWR, which uses a passive safety system, will be described. The conventional passive safety BWR includes passive cooling system pools 30a and 30b that keep cooling water above a containment vessel 3. In many cases, the passive cooling system pools 30a and 30b are connected together via a communicating pipe (not shown) so that the cooling water can move therebetween. Inside the passive cooling system pools 30a and 30b, a passive containment cooling system heat exchanger (PCCS Hx) 31a and a reactor isolation cooling system heat exchanger (IC Hx) 31b are provided. The PCCS Hx 31a cools the steam that is released into the containment vessel 3 in the event of an accident, and sends condensed water back into the containment vessel 3. The IC Hx 31b cools the steam inside the reactor pressure vessel 2 in the event of reactor isolation or an accident, and sends condensed water back into the reactor pressure vessel 2.

The heat that is generated at a time when the steam is cooled by the PCCS Hx 31a or the IC Hx 31b is transferred to the cooling water inside the passive cooling system pools 30a and 30b. After a certain period of time, the cooling water becomes so high enough in temperature that the cooling water starts boiling. The steam generated by the boiling of the cooling water is released to the external environment via exhaust ports 32a and 32b, which are provided in upper portions of the passive cooling system pools 30a and 30b. In many cases, the tips of the exhaust ports 32a and 32b are equipped with insect screens (not shown) in order to prevent insects and the like from getting into from the outside.

The upper portions of the passive cooling system pools 30a and 30b are covered with an operation floor 14. In a reactor well 10, shielding water 33 is always stored during normal operation. Radiation shielding effect of the shielding water 33 is almost equal to that of the shield plug 13 (FIG. 8). Therefore, no shield plug is placed. Above the operation floor 14 is an operation floor area 14a. The portion of the reactor building 15 (operation floor area wall) that covers an upper portion of the operation floor area 14a may be dome-shaped, as shown in FIG. 9. In such a case, the operation floor area wall is referred to as an operation floor dome 14b. In many cases, the reactor building 15 is built outside the operation floor dome 14b and the containment vessel 3, in such a way as to encircle the sidewalls of the containment vessel 3. In this case, as shown in FIG. 9, the operation floor area 14a makes up the space independent of a portion of the reactor building 15 that surrounds the sidewalls of the containment vessel 3.

Suction pipes 20 of a standby gas treatment system 19 are a large number of ramified pipes, which can take in the atmosphere from the operation floor area 14a inside the operation floor dome 14b as well as from other parts in the reactor building 15.

In another example of the passive safety BWR, the containment vessel 3, the passive cooling system pools 30a and 30b, and the operation floor area 14a may be housed in a reactor building (not shown) whose structure is the same as the reactor building 15 of ABWR (See FIG. 8). Even in this case, the outlets of the exhaust ports 32a and 32b of the passive cooling system pools lead to the environment outside the reactor building 15. However, there is a case where a standby gas treatment system is not provided like ESBWR (Economic Simplified Boiling Water Reactor) whose safety systems consists only of a passive safety system.

As an example of the reactor building gas treatment system for reactor accident, for example, the technology disclosed in Patent Document 1 (Japanese Patent Application Laid-Open Publication No. 2005-43131; the entire content of which is incorporated herein by reference) is known.

DETAILED DESCRIPTION

In the conventional BWR, there is a possibility in the event of a severe accident that the operation floor area 14a is filled with hydrogen as a result of leakage via the containment vessel head flange 9, the first isolation valve 17 and the second isolation valve 18 provided on the penetrating pipes 16, and the like. In order to prevent the detonation of hydrogen in a severe accident, the hydrogen vent system 28, which is installed near the ceiling of the reactor building 15, can be opened. However, radioactive materials that leak from the containment vessel 3 are released to the environment along with hydrogen. Therefore, in terms of reducing radiation exposure, the hydrogen vent system 28 should not be opened as much as possible. Moreover, there is a possibility that radioactive materials that leak through the penetrating pipes 16 and the isolation valves 17 and 18 could be released directly to the environment outside the reactor building 15.

If the standby gas treatment system 19 can operate even in a severe accident, the filter (filter train) 22 can remove 99% or more of radioactive materials such as cesium iodide (CsI). The residual radioactive materials, such as radioactive noble gas, and hydrogen can be released from a high position via the main stack 24. In this manner, it is desirable that, in the event of a severe accident, hydrogen that has leaked into the operation floor area 14a be released through the standby gas treatment system 19 which at the same time removes radioactive materials.

It is also desirable that radioactive materials leaking to the environment outside the reactor building 15 through the isolation valves 17 and 18 of the penetrating pipes 16 be removed by the standby gas treatment system 19. Accordingly, electric power needs to be supplied from a alternate power source even at the time of a severe accident so that the standby gas treatment system 19 can operate.

However, if water is poured by a fire truck 27 or the like into the reactor well 10 from the outside in order to cool the containment vessel head flange 9, the poured water starts boiling due to the heat from the containment vessel head 8. As a result, the steam leaks through the gap 13b of the shield plug 13, and fills the operation floor area 14a. The standby gas treatment system 19 takes in the steam via the suction pipes 20 to the point where the amount of the steam exceeds the processing capacity of the heater 60. As a result, the steam gets into the filter train 22, and the filter train 22 loses its function to remove radioactive materials.

In the case of the conventional passive safety BWR, if the shielding water 33 gets boiling by heat from the containment vessel head 8 at the time of a severe accident, the steam fills the operation floor area 14a. As a result, the standby gas treatment system 19 loses its function to remove radioactive materials in the same way.

The object of embodiments of the present invention is to prevent the operation floor area from being filled with steam generated by boiling of water in the reactor well in the event of a severe accident, to allow the standby gas treatment system to operate, to treat radioactive materials inside the reactor building and release gas inside the reactor building to the environment, and to enable the standby gas treatment system to treat radioactive materials leaking to the environment outside the reactor building through the penetrating pipes.

According to an embodiment, there is provided a nuclear power plant comprising: a core; a reactor pressure vessel that houses the core; a containment vessel that houses the reactor pressure vessel; a containment vessel head of the containment vessel; a reactor building that surrounds at least part of the containment vessel; a sidewall that surrounds a periphery of the containment vessel head and extends upward; a bottom portion that is connected to a lower end of the sidewall and is connected to the containment vessel; a reactor well that is formed by the containment vessel head, the sidewall, and the bottom portion; a reactor well upper lid that is provided in an upper portion of the reactor well; an operation floor that is joined to an upper end of the sidewall and is provided on a periphery of the sidewall; an operation floor area wall that surrounds a periphery and upper portion of the operation floor to form an operation floor area and is part of the reactor building; a standby gas treatment system including: a suction pipe to take in gas inside the reactor building; an exhaust fan to drive the gas that the suction pipe takes in; a standby gas treatment system exhaust pipe to release the gas that the suction pipe takes in to an environment outside the reactor building via the exhaust fan; a heater that is disposed between the suction pipe and the standby gas treatment system exhaust pipe and uses electric power to heat the gas that the suction pipe takes in; and a filter to filter the gas heated by the heater to send the gas to the standby gas treatment system exhaust pipe; and a reactor well exhaust section to release the gas inside the reactor well to the environment without releasing the gas into the operation floor area in an event of a severe accident.

According to another embodiment, there is provided a reactor building gas treatment system of a nuclear power plant that includes a containment vessel housing a reactor pressure vessel, and a reactor building surrounding at least part of the containment vessel, wherein: the nuclear power plant includes: a sidewall that surrounds a periphery of a containment vessel head of the containment vessel and extends upward, a bottom portion that is connected to a lower end of the sidewall and is connected to the containment vessel, a reactor well that is formed by the sidewall and the bottom portion surrounding the containment vessel head, a reactor well upper lid that is provided in an upper portion of the reactor well, an operation floor that is joined to an upper end of the sidewall and is provided on a periphery of the sidewall, and an operation floor area wall that surrounds a periphery and upper portion of the operation floor to form an operation floor area and is part of the reactor building; and the reactor building gas treatment system comprises: a standby gas treatment system including: a suction pipe to take in gas inside the reactor building; an exhaust fan to drive the gas that the suction pipe takes in; a standby gas treatment system exhaust pipe to release the gas that the suction pipe takes in to an environment outside the reactor building via the exhaust fan; a heater that is disposed between the suction pipe and the standby gas treatment system exhaust pipe and uses electric power to heat the gas that the suction pipe takes in; and a filter to filter the gas heated by the heater to send the gas to the standby gas treatment system exhaust pipe; an alternate power source that supplies power to the standby gas treatment system in an event of a severe accident, and a reactor well exhaust section to release the gas inside the reactor well to the environment without releasing the gas into the operation floor area in an event of a severe accident.

According to yet another embodiment, there is provided a reactor building gas treatment system of a nuclear power plant, the nuclear power plant including: a reactor building, a containment vessel that is provided inside the reactor building and whose upper portion is equipped with a containment vessel head; a reactor pressure vessel that is housed in the containment vessel and below the containment vessel head; a reactor well that is provided above the containment vessel head of the reactor building; and an operation floor area that is provided above the reactor well of the reactor building, wherein the reactor building gas treatment system comprises: a suction pipe to take in gas inside the reactor building; a filter to filter the gas that the suction pipe takes in; a standby gas treatment system exhaust pipe to release the gas filtered by the filter to outside the reactor building; and a reactor well exhaust section to release the gas inside the reactor well to outside the reactor building without releasing the gas into the operation floor area.

Embodiments of the present invention will be described with reference to FIGS. 1 to 7. In FIGS. 1 to 7, the components that are the same as, or similar to, those in FIGS. 8 and 9 are represented by the same reference symbols, and will not be described again. Only essential parts will be described.

First Embodiment

Figure 1:
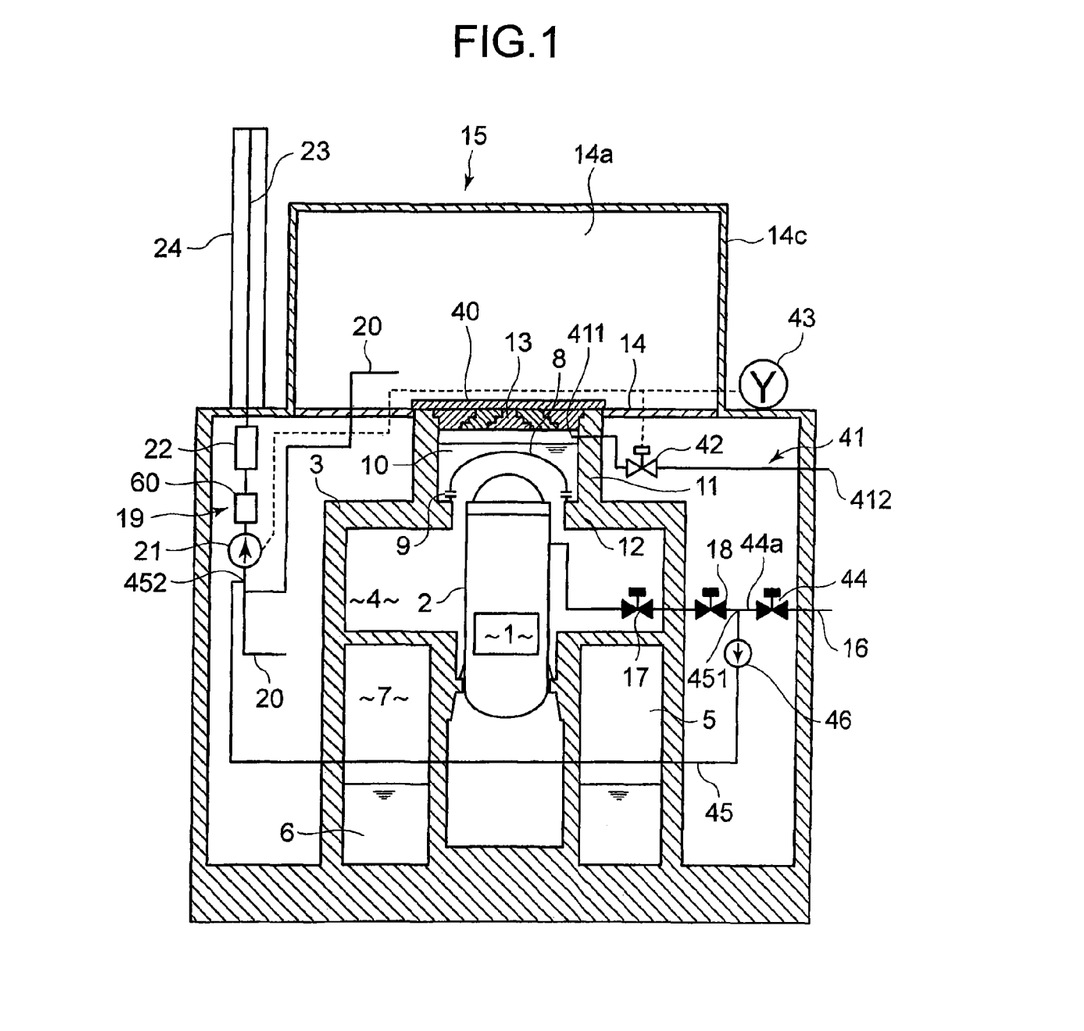
FIG. 1 is an elevation view of a first embodiment of a nuclear power plant with a reactor building gas treatment system relating to the present invention.

With reference FIG. 1, a first embodiment of a nuclear power plant that includes a reactor building gas treatment system of the present invention will be described.

According to the first embodiment of the present invention, a containment vessel and a reactor building of ABWR are used. However, the type of the containment vessel and reactor building is not limited to them. The present invention can be generally applied to the containment vessels and the reactor buildings of BWR/2, BWR/3, BWR/4, and BWR/5, which share common characteristics with the containment vessel and the reactor building of ABWR.

According to the first embodiment, a reactor well upper lid 40 is disposed on the shield plug 13. The reactor well upper lid 40 is made of a material that has sealing properties to block steam and can withstand high-temperature steam. For example, the reactor well upper lid 40 may be made of iron, aluminum, heat-resistant rubber, or heat-resistant resin.

A reactor well exhaust section is formed in such a way as to connect the reactor well 10 to the environment outside the reactor building 15. The reactor well exhaust section includes a reactor well exhaust pipe 41 and a reactor well exhaust pipe isolation valve 42. One end (first end) 411 of the reactor well exhaust pipe 41 is opened inside the reactor well 10. The reactor well exhaust pipe 41 passes through the reactor well sidewall 11, and the other end (second end) 412 of the reactor well exhaust pipe 41 is open to the environment outside the reactor building 15. The reactor well exhaust pipe isolation valve 42 is installed on the reactor well exhaust pipe 41 in the reactor building 15. As the reactor well exhaust pipe isolation valve 42, any type of valve that can be opened and closed can be used. In FIG. 1, what is used is a remote-operated motor-driven valve which comes with a handle to enable manual operation on site as well.

An alternate power source 43 is provided to supply electric power to the reactor well exhaust pipe isolation valve 42. As the alternate power source 43, an air-cooled diesel generator (DG), a gas turbine generator (GTG), or the like may be used. The alternate power source 43 is installed on the reactor building 15, in the case of FIG. 1. However, the installation location is not limited to this. For example, the alternate power source 43 may be placed on a hill or inside a building that is protected against a natural disaster such as tsunami or earthquake. The alternate power source 43 is not required to be permanent equipment. The alternate power source 43 may be portable equipment, which can be stored in a warehouse built on high ground or the like. In this case, the equipment will be carried and connected via a plug in the event of an accident in order to supply electric power. Electric power is also supplied from the alternate power source 43 to the standby gas treatment system 19.

On an outer side of the second isolation valve 18 of penetrating pipes 16, a third isolation valve (penetrating pipes isolation valve) 44 is installed in the reactor building 15. The third isolation valve 44 is an motor-driven valve. The third isolation valve 44 is supplied with electric power from the alternate power source 43; or another DC power source may be provided for it.

One end (first end) 451 of a leakage control pipe 45 branches from an inter-isolation-valve pipe portion 44a, which is located between the second isolation valve 18 and the third isolation valve 44 of the penetrating pipes 16, while the other end (second end) 452 is connected to the suction pipes 20 of the standby gas treatment system 19. In FIG. 1, the leakage control pipe 45 may appear to traverse the containment vessel 3. However, the leakage control pipe 45 is placed in the outer peripheral region of the cylindrical containment vessel 3 in the reactor building 15. A leakage control fan 46 is placed in the middle of the leakage control pipe 45. The leakage control fan 46 is intended to improve the ability to take in the gas. However, the leakage control fan 46 may not be required if an exhaust fan 21 of the standby gas treatment system 19 has a large capacity.

According to the above configuration of the first embodiment, even if a core melt accident occurs as a result of long-term SBO triggered by an earthquake or tsunami, the reactor well exhaust pipe isolation valve 42 can be opened as electric power is supplied from the alternate power source 43. Therefore, the steam that is generated from the water poured into the reactor well 10 and heated by heat from the containment vessel head 8 can be released to the environment outside the reactor building 15 via the reactor well exhaust pipe 41. The reactor well upper lid 40 prevents the steam inside the reactor well 10 from flowing into an operation floor area 14a via the gap 13b of the shield plug 13.

In this manner, even if the standby gas treatment system 19 is operated by electric power supplied from the alternate power source 43, it is possible to prevent excessive amounts of steam getting into the filter (filter train) 22, thereby ensuring that the standby gas treatment system 19 continues operating safely. Accordingly, even if radioactive materials and hydrogen leak into the reactor building 15 from the containment vessel 3 at around a design leakage rate, the standby gas treatment system 19 can treat radioactive materials such as CsI and then release hydrogen, radioactive noble gas, and the like from a high position via the stack 24. In this manner, it is possible to prevent detonation of hydrogen inside the reactor building 15, and to sufficiently reduce an amount of radioactive materials to be released to the surrounding area.

Moreover, the radioactive materials that could have been directly released to the environment outside the reactor building 15 after leaking and passing through the first isolation valve 17 and the second isolation valve 18 of the penetrating pipes 16 are accumulated in the inter-isolation-valve pipe portion 44a as the third isolation valve 44 is closed. Then, the radioactive materials are introduced by the leakage suppression pipe 45 and the leakage suppression fan 46 into the suction pipe 20 of the standby gas treatment system 19, where the radioactive materials can be treated.

As described above, according to this embodiment, even if a huge earthquake and a tsunami, like those that hit the Fukushima Daiichi nuclear power plant, trigger a long-term station blackout at a nuclear plant and a core melt accident occurs as a result, the standby gas treatment system is able to operate and treat radioactive materials leaking from the containment vessel, as well as to release hydrogen inside the reactor building to the environment safely. Moreover, it is possible to prevent radioactive materials from leaking through the isolation valves to the environment outside the reactor building from the penetrating pipes of the containment vessel.

Therefore, even in the event of a core melt accident, the advantage is to be able to safely treat radioactive materials such as CsI and hydrogen that leak from the containment vessel. The advantage is that, since the radioactive contamination of the surrounding areas by CsI and the like is limited, residents in the surrounding areas can return home immediately after the accident is settled even if temporary evacuations have been required.

Second Embodiment

Figure 2:
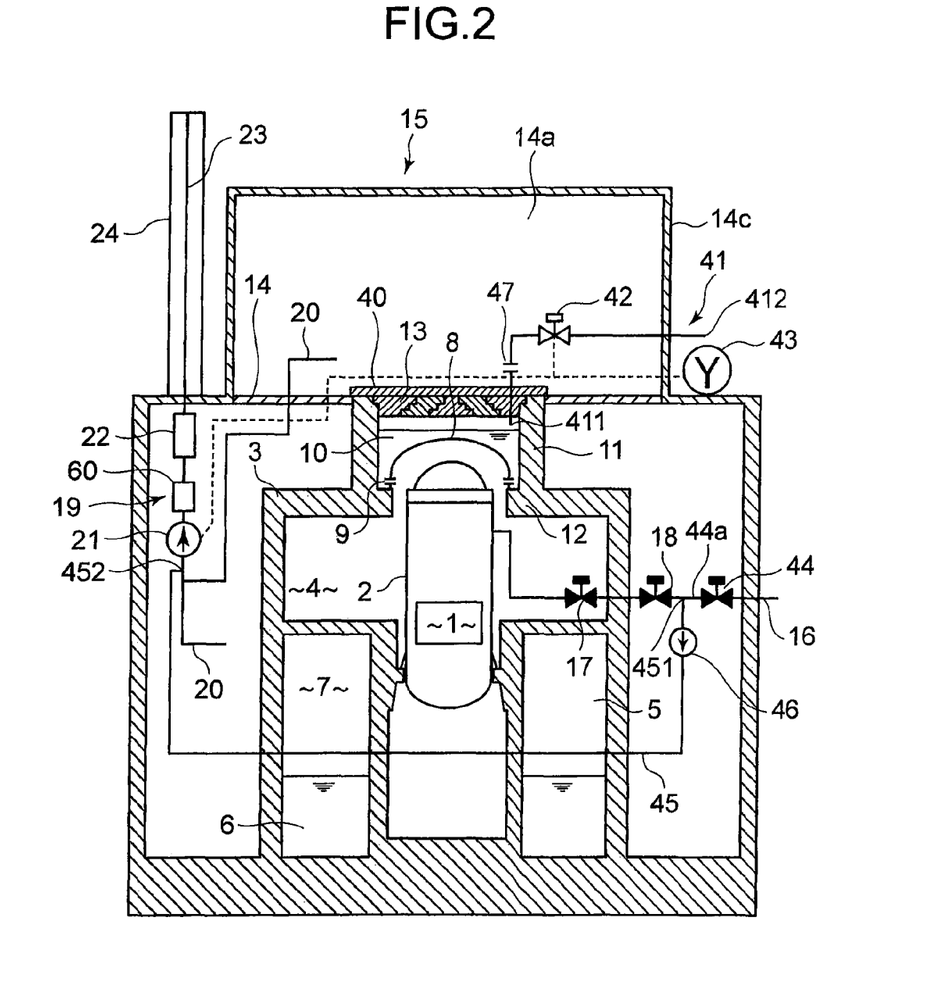
FIG. 2 is an elevation view of a second embodiment of a nuclear power plant with a reactor building gas treatment system relating to the present invention.

With reference FIG. 2, a second embodiment of a nuclear power plant that includes a reactor building gas treatment system of the present invention will be described.

According to the present embodiment, the reactor well exhaust pipe 41 is led to outside the reactor building 15 after passing through the reactor well upper lid 40. At the time of refueling, the reactor well upper lid 40 needs to be detached. Accordingly, in the middle of the reactor well exhaust pipe 41, two flanges 47 are provided: the flanges 47 face each other and are joined together. This configuration allows part of the reactor well exhaust pipe 41 to be detached. According to the present embodiment, even in cases where the reactor well exhaust pipe 41 cannot be placed in such a way as to pass through the reactor well sidewall 11, the reactor well exhaust pipe 41 can be installed.

Third Embodiment

Figure 3:
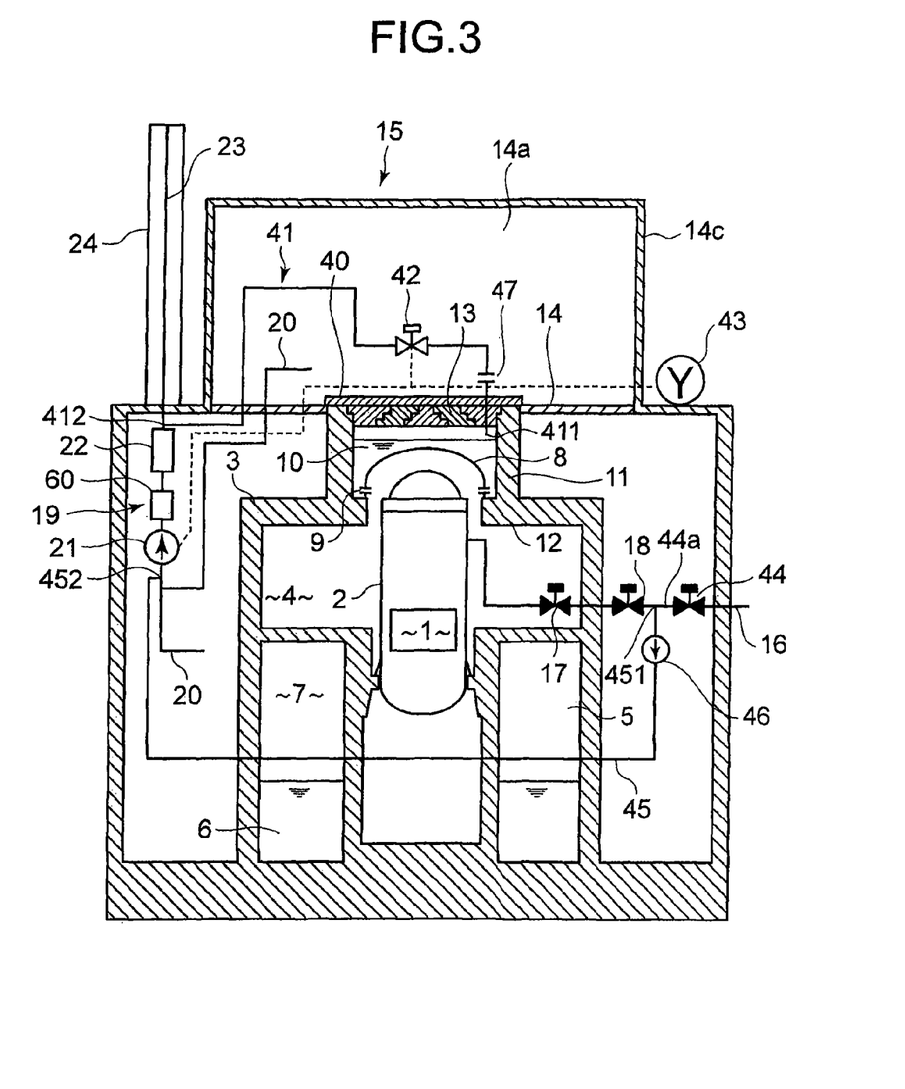
FIG. 3 is an elevation view of a third embodiment of a nuclear power plant with a reactor building gas treatment system relating to the present invention.

With reference FIG. 3, a third embodiment of a nuclear power plant that includes a reactor building gas treatment system of the present invention will be described.

The present embodiment is a variant of the second embodiment. One end (first end) 411 of the reactor well exhaust pipe 41 is opened inside the reactor well 10, and the other end (second end) 412 is joined to the standby gas treatment system exhaust pipe 23 of the standby gas treatment system 19. The rest of the configuration is the same as that of the second embodiment.

According to the third embodiment, the exhaust gas can be released through the stack 24. Even if the exhaust gas contains radioactive noble gas or the like that leaks from the containment vessel head 8, the gas is released from a high position. Therefore, it is possible to lower radioactive concentration through atmospheric dispersion.

Fourth Embodiment

Figure 4:
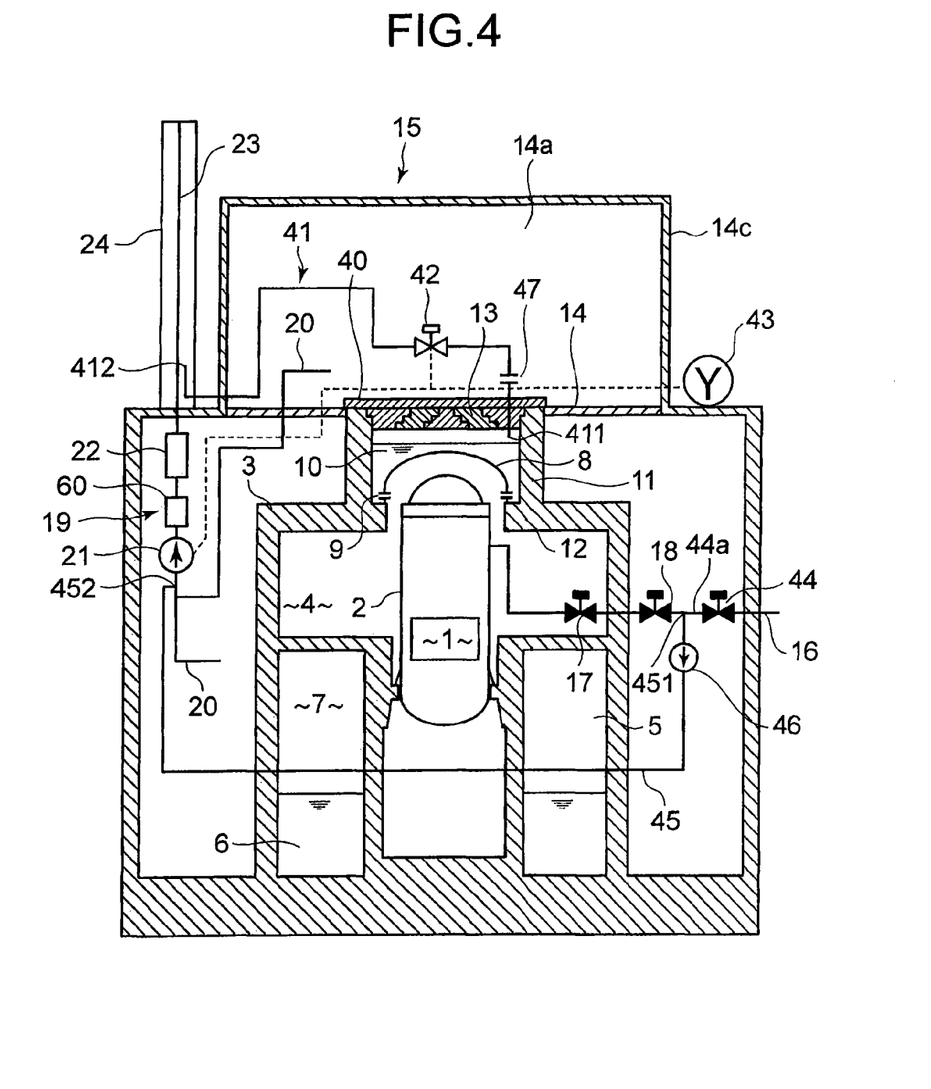
FIG. 4 is an elevation view of a fourth embodiment of a nuclear power plant with a reactor building gas treatment system relating to the present invention.

With reference FIG. 4, a fourth embodiment of a nuclear power plant that includes a reactor building gas treatment system of the present invention will be described.

The present embodiment is a variant of the third embodiment. The second end 412 of the reactor well exhaust pipe 41 is not connected to the standby gas treatment system exhaust pipe 23 but is directly opened inside the stack 24. The rest of the configuration is the same as that of the third embodiment.

According to the fourth embodiment, as in the case of the third embodiment, the exhaust gas can be released through the stack 24, and the same advantageous effects as in the third embodiment can be achieved.

Fifth Embodiment

Figure 5:
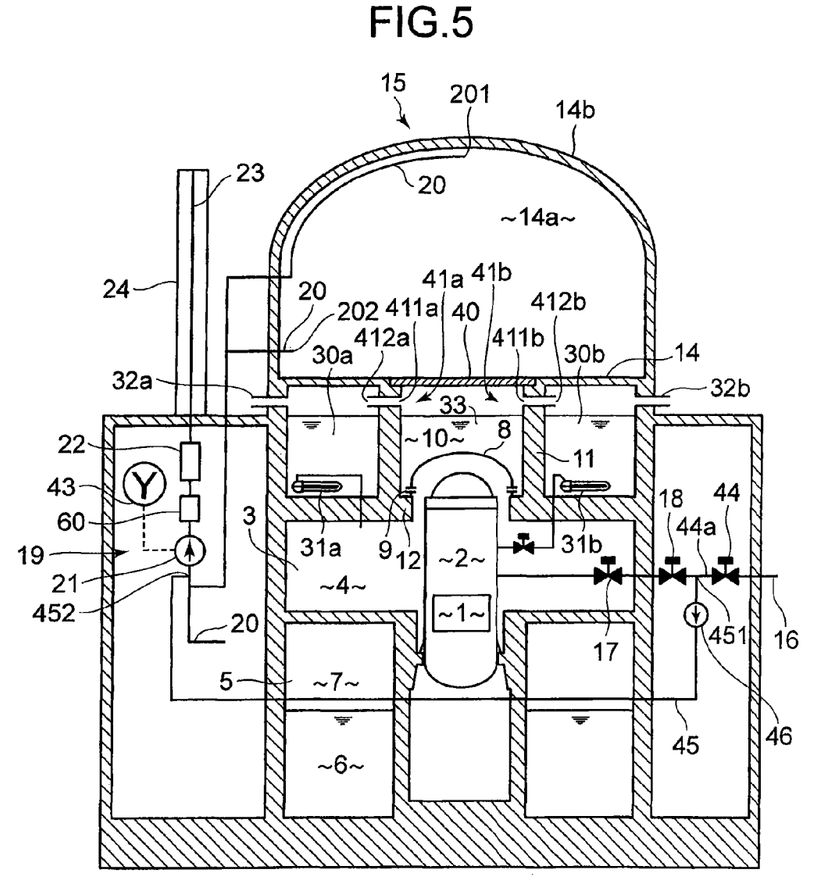
FIG. 5 is an elevation view of a fifth embodiment of a nuclear power plant with a reactor building gas treatment system relating to the present invention.

With reference FIG. 5, a fifth embodiment of a nuclear power plant that includes a reactor building gas treatment system of the present invention will be described.

According to the present embodiment, reactor well exhaust pipes 41a and 41b are provided in such a way as to pass through the reactor well sidewall 11 and to be opened in gas phase portions of passive cooling system pools 30a and 30b. That is, one end (first end) 411a of the reactor well exhaust pipe 41a is opened inside the reactor well 10, and the other end (second end) 412a is opened in the gas phase portion of the passive cooling system pool 30a. Similarly, one end (first end) 411b of the reactor well exhaust pipe 41b is opened inside the reactor well 10, and the other end (second end) 412a is opened in the gas phase portion of the passive cooling system pool 30b.

The suction pipes 20 of the standby gas treatment system 19 include an operation floor area upper opening 201 and an operation floor area lower opening 202. The operation floor area upper opening 201 is located near the top of the operation floor dome 14b. The operation floor area lower opening 202 is located near the operation floor 14.

According to the present embodiment, the reactor well exhaust pipes 41a and 41b are not required to extend over a long distance. The steam inside the reactor well 10 is once led to the passive cooling system pools 30a and 30b via the reactor well exhaust pipes 41a and 41b, and is then released to the outside environment via exhaust ports 32a and 32b. Moreover, the operation floor dome 14b has a dome-shaped ceiling, and hydrogen is likely to be accumulated in the top portion thereof. However, the suction pipes 20 that are placed in the top portion helps the standby gas treatment system 19 take in hydrogen efficiently, and the gas can be safely released to the outside environment via the stack 24.

Sixth Embodiment

Figure 6:
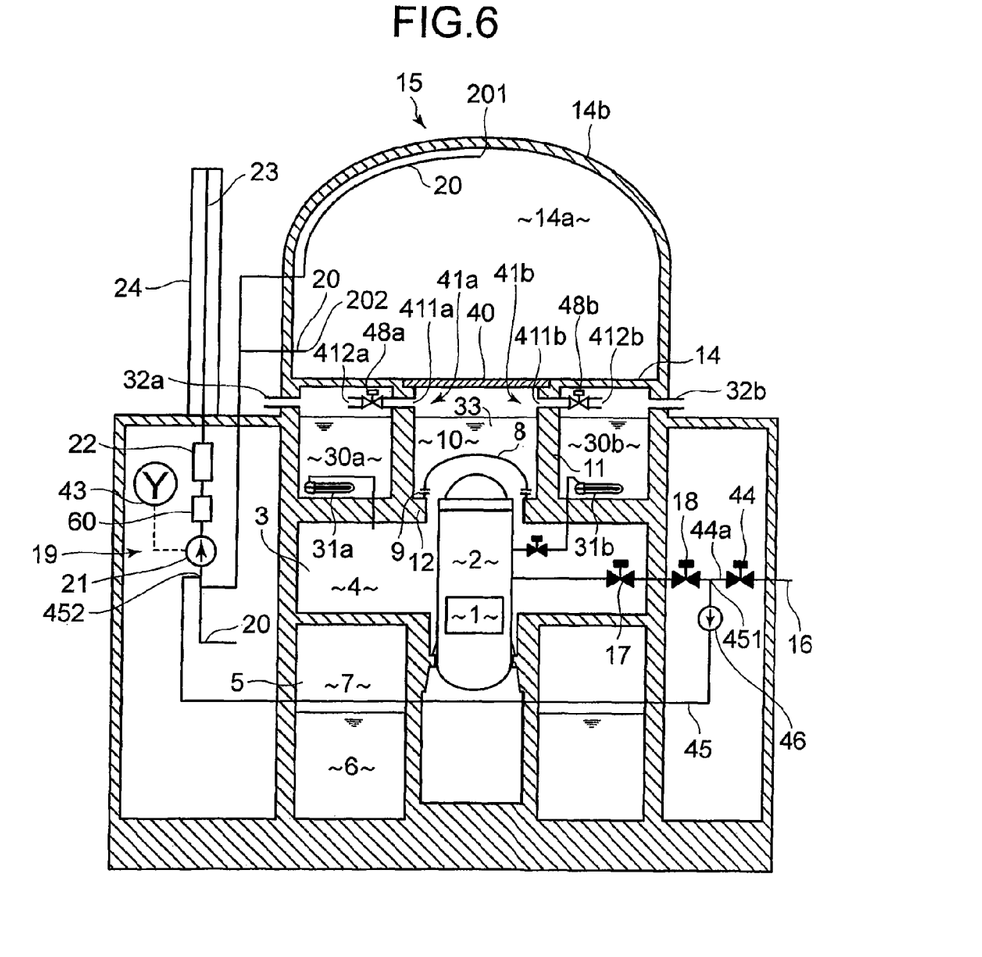
FIG. 6 is an elevation view of a sixth embodiment of a nuclear power plant with a reactor building gas treatment system relating to the present invention.

With reference FIG. 6, a sixth embodiment of a nuclear power plant that includes a reactor building gas treatment system of the present invention will be described.

The present embodiment is a variant of the fifth embodiment. On reactor well exhaust pipes 41a and 41b, reactor well exhaust pipe isolation valves 48a and 48b are provided. The reactor well exhaust pipe isolation valves 48a and 48b are motor-driven valves, for example, and use the alternate power source 43 as a power source. The rest of the configuration is the same as that of the fifth embodiment.

The reactor well exhaust pipe isolation valves 48a and 48b are closed, and, at the time of refueling, the water level inside the reactor well 10 can rise to near the height of the operation floor 14.

As the power source of the motor-driven valves, besides the alternate power source 43, another DC power source (not shown) may be provided.

Seventh Embodiment

Figure 7:
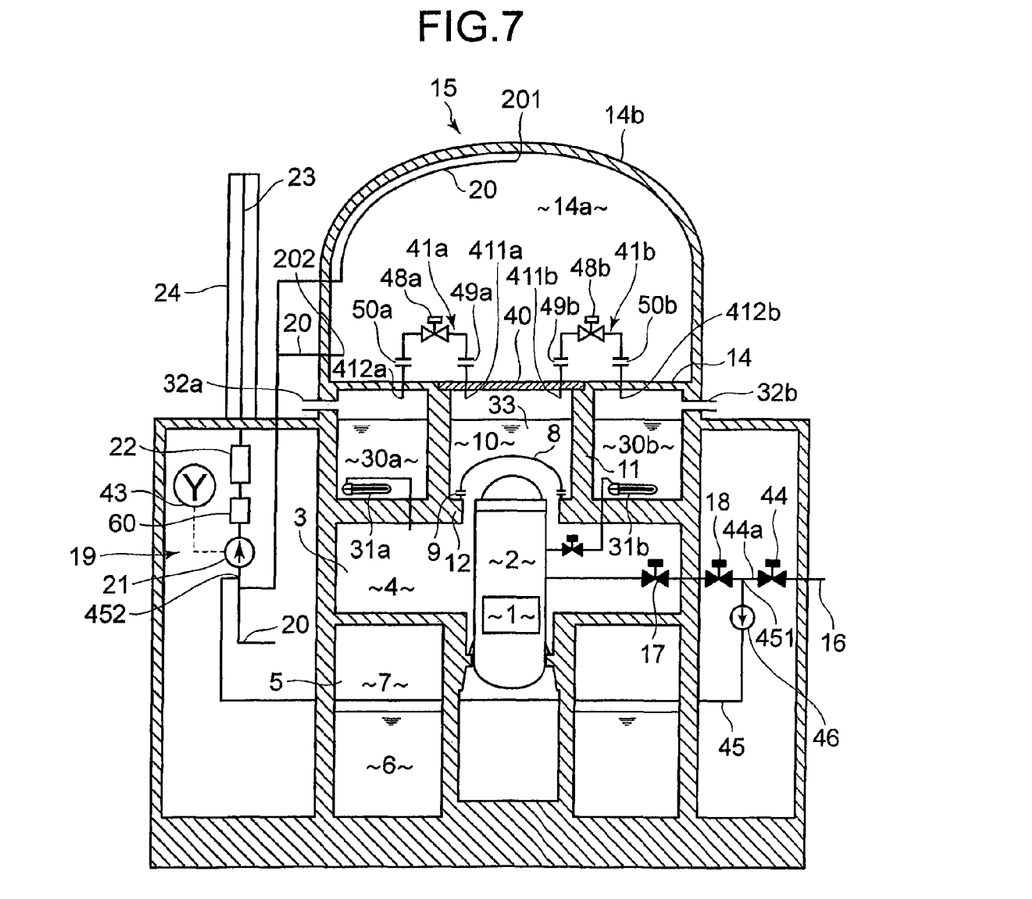
FIG. 7 is an elevation view of a seventh embodiment of a nuclear power plant with a reactor building gas treatment system relating to the present invention.

With reference FIG. 7, a seventh embodiment of a nuclear power plant that includes a reactor building gas treatment system of the present invention will be described.

The present embodiment is a variant of the sixth embodiment. Reactor well exhaust pipes 41a and 41b pass through the reactor well upper lid 40 and then the operation floor 14 before being led to gas phase portions of the passive cooling system pools 30a and 30b. At the time of refueling, the reactor well upper lid 40 is detached. Accordingly, in the middle of the reactor well exhaust pipes 41a and 41b, flanges 49a and 49b and 50a and 50b are provided so that the reactor well exhaust pipes 41a and 41b can be detached. The rest of the configuration is the same as that of the sixth embodiment.

According to the present embodiment, in cases where the reactor well exhaust pipes 41a and 41b cannot be installed in such a way as to pass through the reactor well sidewall 11, the reactor well exhaust pipes 41a and 41b can be placed through the space above the operation floor 14.

OTHER EMBODIMENTS

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nuclear power plant comprising:
a core;
a reactor pressure vessel that houses the core;
a containment vessel that houses the reactor pressure vessel;
a containment vessel head of the containment vessel;
a reactor building that surrounds at least part of the containment vessel;
a sidewall that surrounds a periphery of the containment vessel head and extends upward;
a bottom portion that is connected to a lower end of the sidewall and is connected to the containment vessel;
a reactor well that is formed by the containment vessel head, the sidewall, and the bottom portion;
a reactor well upper lid that is provided in an upper portion of the reactor well;
an operation floor that is joined to an upper end of the sidewall and is provided on a periphery of the sidewall;
an operation floor area wall that surrounds a periphery and upper portion of the operation floor to form an operation floor area and is part of the reactor building;
a standby gas treatment system including:
a suction pipe to take in gas inside the reactor building;
an exhaust fan to chive the gas that the suction pipe takes in;
a standby gas treatment system exhaust pipe to release the gas that the suction pipe takes in to an environment outside the reactor building via the exhaust fan;
a heater that is disposed between the suction pipe and the standby gas treatment system exhaust pipe and uses electric power to heat the gas that the suction pipe takes in; and
a filter to filter the gas heated by the heater and to send the gas to the standby gas treatment system exhaust pipe; and
a reactor well exhaust section to release the gas inside the reactor well to the environment without releasing the gas into the operation floor area in an event of a predetermined accident.

2. The nuclear power plant according to claim 1, wherein the reactor well exhaust section includes:
a reactor well exhaust pipe having a first end that is opened inside the reactor well and a second end that is opened in the environment, the reactor well exhaust pipe passing through the sidewall; and
a reactor well exhaust pipe isolation valve that is provided on the reactor well exhaust pipe.

3. The nuclear power plant according to claim 1, wherein the reactor well exhaust section includes:
a reactor well exhaust pipe having a first end that is opened inside the reactor well and a second end that is opened in the environment, the reactor well exhaust pipe passing through the reactor well upper lid;
a reactor well exhaust pipe isolation valve that is provided on the reactor well exhaust pipe; and
a flange that is provided on the reactor well exhaust pipe.

4. The nuclear power plant according to claim 1, wherein the reactor well exhaust section includes:
a reactor well exhaust pipe having a first end that is opened inside the reactor well and a second end that is connected to the standby gas treatment system exhaust pipe, the reactor well exhaust pipe passing through the reactor well upper lid;
a reactor well exhaust pipe isolation valve that is provided on the reactor well exhaust pipe; and
a flange that is provided on the reactor well exhaust pipe.

5. The nuclear power plant according to claim 1, further comprising
a stack that surrounds an outer periphery of the standby gas treatment system exhaust pipe and extends in an up-down direction, with an upper end thereof being opened, wherein
the reactor well exhaust section includes:
a reactor well exhaust pipe having a first end that is opened inside the reactor well and a second end that is opened inside the stack and outside the standby gas treatment system exhaust pipe, the reactor well exhaust pipe passing through the reactor well upper lid;

a reactor well exhaust pipe isolation valve that is provided on the reactor well exhaust pipe; and a flange that is provided on the reactor well exhaust pipe in such a way as to connect parts of the reactor well exhaust pipe together in a detachable manner.

6. The nuclear power plant according to claim 1, wherein:

outside the sidewall, a passive cooling system pool is formed in such a way that a pool water surface is formed inside and an area above the pool water surface is opened to the environment; and the reactor well exhaust section includes a reactor well exhaust pipe having a first end that is opened inside the reactor well and a second end that is opened above the pool water surface, the reactor well exhaust pipe passing through the sidewall.

7. The nuclear power plant according to claim 6, further comprising a reactor well exhaust pipe isolation valve that is provided on the reactor well exhaust pipe.

8. The nuclear power plant according to claim 1, wherein:

outside the sidewall, a passive cooling system pool is formed in such a way that a pool water surface is formed inside and an area above the pool water surface is opened to the environment; and the reactor well exhaust section includes a reactor well exhaust pipe having a first end that is opened inside the reactor well and a second end that is opened above the pool water surface, the reactor well exhaust pipe passing through the reactor well upper lid;

a reactor well exhaust pipe isolation valve that is provided on the reactor well exhaust pipe; and a flange that is provided on the reactor well exhaust pipe in such a way as to connect parts of the reactor well exhaust pipe together in a detachable manner.

9. The nuclear power plant according to claim 1, wherein the suction pipe has an operation floor area upper opening to take in gas in an upper portion of the operation floor area.

10. The nuclear power plant according to claim 1, further comprising:

a penetrating pipe that passes through the containment vessel and the reactor building;

two penetrating pipe isolation valves that are provided on the penetrating pipe and outside the containment vessel and inside the reactor building in such a way as to be connected to each other in series; and a leakage control pipe that branches from the penetrating pipe and between the two penetrating pipe isolation valves and is connected to the suction pipe.

11. The nuclear power plant according to claim 10, further comprising a leakage control fan that is provided on the leakage control pipe to promote a flow of gas from a side of the penetrating pipe to a side of the suction pipe.

12. The nuclear power plant according to claim 1, further comprising a alternate power source that supplies electric power to the standby gas treatment system in the event of a predetermined accident.

* * * * *